Figure 1:
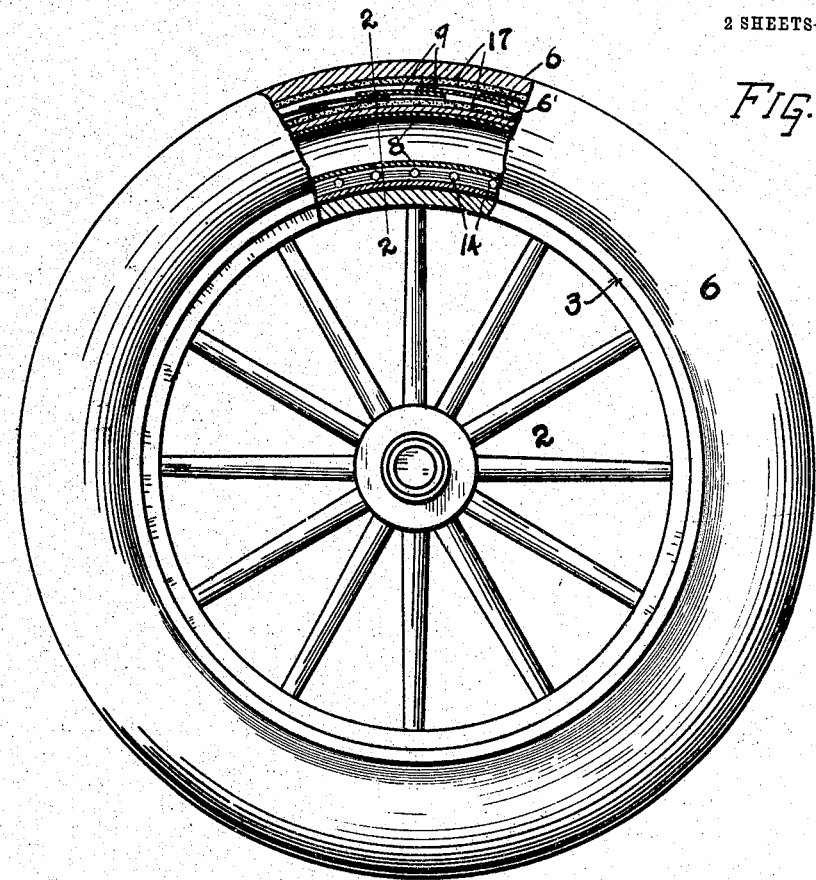

E. J. C. TIMERMAN.
PUNCTURE PROOF TIRE.
APPLICATION FILED JULY 31, 1908.

923,733.

Patented June 1, 1909.

2 SHEETS—SHEET 1.

WITNESSES
Chas. H. Haughes.
R. L. Wallace.

INVENTOR
Eugene J. C. Timerman
BY
Harry D. Wallace
ATTORNEY

E. J. C. TIMERMAN.
PUNCTURE PROOF TIRE.
APPLICATION FILED JULY 31, 1908.

923,733.

Patented June 1, 1909.
2 SHEETS—SHEET 2.

WITNESSES
Chas. H. Hughes
R. L. Wallace

INVENTOR
Eugene J. C. Timerman.
BY
Harry L. Wallace
ATTORNEY

UNITED STATES PATENT OFFICE.

EUGENE J. C. TIMERMAN, OF SYRACUSE, NEW YORK, ASSIGNOR OF ONE-THIRD TO LOUIS C. CROWELL, OF SYRACUSE, NEW YORK.

PUNCTURE-PROOF TIRE.

No. 923,733.   Specification of Letters Patent.   Patented June 1, 1909.

Application filed July 31, 1908. Serial No. 446,238.

*To all whom it may concern:*

Be it known that I, EUGENE J. C. TIMERMAN, a citizen of the United States, residing at Syracuse, in the county of Onondaga and State of New York, have invented certain new and useful Improvements in Puncture-Proof Tires, of which the following is a specification.

This invention relates to improvements in tires, designed for use in connection with vehicle wheels, and the invention relates particularly to a pneumatic tire such as used for automobiles, and has for its object the providing of a shield or protector, to be applied between the outer casing and the air tube of the common double tube tire, for the purpose of rendering the tire puncture-proof and also to prevent the same from blowing up.

The invention consists of a hollow outer casing preferably made of rubber, or rubber and fiber capable of being readily attached to the rim of a wheel, and an inner pneumatic tube adapted for insertion in the outer casing.

The invention further consists of a series of novel metallic armor or mail parts, preferably made of hard steel, in the form of arc-shaped segments or shells, and arranged to overlap each other to form an annular shield or protector. The said armor is disposed in a hollow compartment formed between the outer and inner walls of the tire casing, in a position to cover and protect the inner-tube from puncture.

The invention further consists of a woven metal part, arranged in the form of an annular belt or apron, and disposed in the hollow compartment of the casing on each side of the tire beneath the metallic shells, the upper edge of each woven belt being connected to the rear half of each shell, for guying the armor and holding the same centrally with respect to the head of the tire. Each woven metal portion has a series of equally-spaced stout chain-like strands connected at their upper ends to one end of the shells, their lower ends being secured by anchor-bolts embedded in the material comprising the casing.

The invention further consists of a leather casing or jacket which entirely incloses the armor plates and woven metal guys. The said leather casing is employed for holding the metallic parts in place, and also for preventing said parts from cutting, or otherwise injuring the rubber casing and the pneumatic tubes.

The invention further consists in the combinations, construction and arrangement of the parts of the tire as hereinafter described, illustrated by the accompanying drawings, and then pointed out in the claims.

Figure 2:
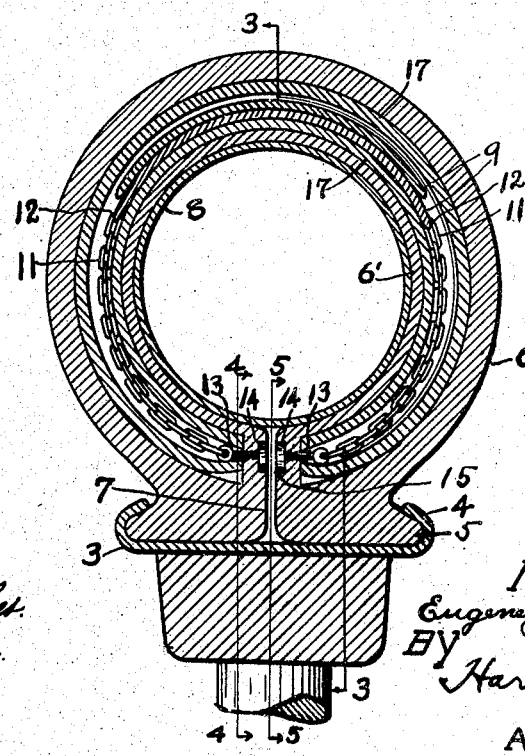
Figure 3:
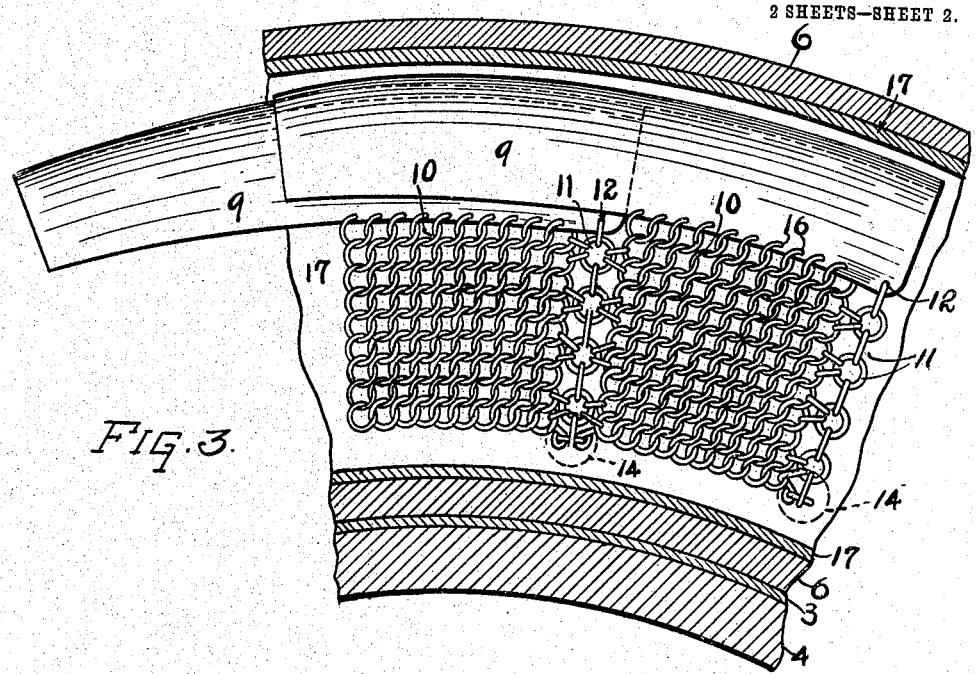
Figure 4:
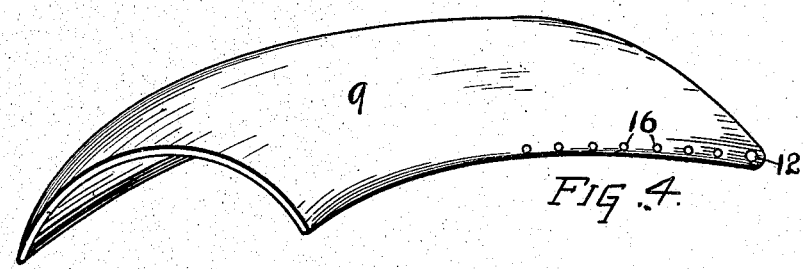
Figure 5:
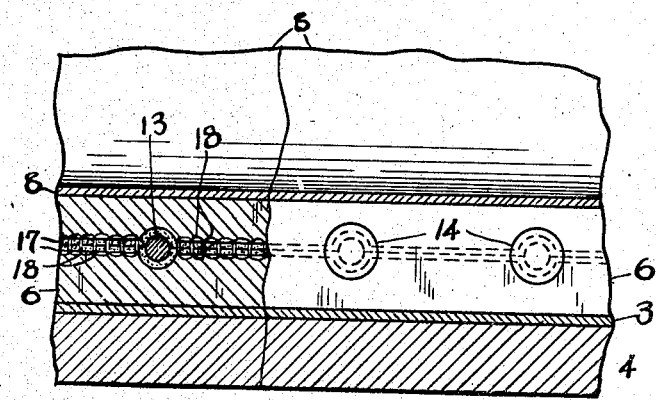

Referring to the drawings, Figure 1 is a side view of a wheel with double tube tire, a portion of the same being in section, showing the construction and arrangement of the shield and related parts. Fig. 2 is an enlarged cross section substantially on the line 2—2 of Fig. 1, showing the manner of constructing and disposing the armor plates and the anchor chains; also showing the leather casing for the metallic parts. Fig. 3 is an enlarged detail section substantially on the line 3—3 of Fig. 2, showing the manner of over-lapping the armor shells; also showing the construction and manner of applying the woven metal parts which hold the armor shells in place. Fig. 4 is a perspective view of one of the armor shells. Fig. 5 is an enlarged detail section, taken partly on line 4—4, and partly on line 5—5 of Fig. 2, showing the method of securing the leather casing to the lower edges of the woven wire; also showing the manner of applying the anchor bolts.

Similar characters of reference designate corresponding parts throughout the several views.

In the drawings, 2 represents a wheel, which may be constructed in any suitable manner, but preferably having a metallic rim 3, provided with inwardly turned lips 4, for engaging and holding the outwardly formed flanges or hooks 5 of the outer tire casing 6. The tire casing 6 may be constructed of any suitable material, but is preferably made of rubber or like substance, such as commonly used for the casings or shoes of automobile tires. The casing 6 is preferably made as herein shown and described, the inner circumferential wall next to the rim being provided with an annular split or opening 7 for inserting an air tube 8, which may be constructed in any suitable manner.

9, 9 represents a series of arc-shaped armor shells or parts designed particularly for protecting and shielding the pneumatic tube 8, for preventing puncture in the same. The armor or mail segments 9, are preferably semi-cylindrical in cross-section, and are intended to be applied, as shown in the drawings, the said segments or shells preferably overlapping each other in regular order, as shown in Figs. 1 and 3, and a sufficient number provided to form an annular shield or protector, which encircles the wheel outside of the inner tube. It is preferred in applying the shells 9 to overlap them to the extent of about one half the length of each. The shells are not connected to each other, except in overlapping them, the underside of one shell contacts with the upper side of the preceding one.

In order to hold the shells or segments 9 in operative position centrally with respect to the tread of the wheel, I provide two annular anchor belts or sections of woven metal 10, preferably consisting of steel wire, which connect at their upper edges to the opposite edges of the shells 9, as shown in Figs. 2 and 3; the opposite edges of one end of each shell being perforated, as at 16, to receive the upper links of the anchor belt. The woven-wire parts 10 are provided at regular intervals with heavy transverse chain-like strands 11, which are inter-woven with the lighter links of the belts and also connect at their upper ends with the shells 9, as indicated at 12. The lower ends of the chains 11 connect with anchor bolts or studs 13, having flat circular heads 14, which are embedded in the rubber of the outer casing, as indicated at 15 in Fig. 2. The perforations 16 preferably extend about one half the length of the shells, as shown, and each shell is perforated and connected with the two anchor belts in the same manner, as shown in Fig. 3. It being characteristic of all inflated tire to flatten out somewhat at the point of the tread, it is necessary to apply the armor segments 9 so that they may readily conform to the flattening of the tire. To this end the free end of a shell which overlaps the adjacent shell is allowed a certain amount of freedom, in order that they may yield in a suitable manner when the weight of the vehicle is thrown upon them.

In order to support and hold the segments 9 and the woven aprons 10 in place, and also to prevent these hard metallic parts from cutting or otherwise injuring the casing 6, I provide a leather or rawhide case or jacket 17, which entirely incloses the metallic shells and belts. As shown in Fig. 2, the leather envelop 17 is preferably made in two parts, one forming the outer, and the other forming the inner sides, and the free edges are brought together at each side of the central split 7 of casing 6, as shown in Figs. 2 and 5. The leather sections are then stitched or otherwise suitably secured to each other, also to the lower edges of the wire belts, as shown by the numerals 18 in Fig. 5. The only portion of the metallic parts which is not inclosed in the leather jacket 17 is the outer ends of the anchor bolts 14. In making up and assembling the armor and anchor belts for incorporation with the outer casing 6, these parts are all securely connected to each other and inclosed in the leather jacket 17, in the exact form and arrangement in which the parts are intended to be ready for operation. The leather case containing the metallic parts is then placed in a mold, the same as a core in ordinary casting. The rubber comprising the outer casing 6 is then applied to the mold, in melted or plastic form, in a manner to envelop or inclose the said parts, as shown in Fig. 2. In arranging the parts for casting the casing 6, as just described, the heads of the anchor bolts are disposed so that when the cast of the casing 6 is complete, the heads 14 of the anchor bolts are exposed along the oppositely facing edges of the opening 7, as shown in Figs. 2 and 5. Under this method of constructing the outer casing, owing to the disposition of the steel armor and anchor belts, the outer wall of the casing 6 is preferably made heavy, to stand the wear and tear which a tire of this class may be subjected to. The inner wall 6' is preferably made thinner, because this part of the casing is rarely subjected to any very great strain, and besides it receives considerable support from the inner tube 8, and also the inner section or wall of the leather casing 17.

A great deal of trouble, annoyance and expense has been occasioned in the past by the frequent puncturing of the pneumatic tubes of automobile tires, and many serious and fatal accidents have occurred by reason of the exploding of the tires when the cars have been operated at high speed over rough roads. As hereinbefore explained, the anchor belts or aprons 17, are employed particularly for holding the steel shells 9, in true position between the walls of the casing 6, so that they may afford a complete protection against the puncturing of the inner tube. The anchor belts are also intended for another important purpose, namely, to prevent the bursting or blowing up of the tire. Under the construction and disposition of the armor and woven anchor belts, which practically surround the air tube 8, when the casing is properly fitted to the rim, and the inner tube is inflated by high pressure, the latter will exert a sufficient force against the inner circumferential side of the casing, to render the tire proof against bursting as well as displacement.

It is obvious that some changes or modifications may be made in the parts within the scope defined by the appended claims, and I therefore do not restrict myself to the precise construction and arrangement of the parts of the invention as herein shown and described.

Having thus described my invention, what I claim as new and desire to secure by Letters Patent, is—

1. In combination, a tire comprising an outer casing split or divided at its inner peripheral portion, an air tube in said casing, a hollow leather jacket embedded in the outer casing and comprising inner and outer sections, an annular flexible armor arranged in the leather jacket at the outer portion thereof, flexible belts at opposite sides of the tire and connected at the outer portions thereof with the armor at the edges of the latter, and means connecting the adjacent edges of the section of the leather jacket together and to the flexible belts aforesaid.

2. In combination, a tire comprising an outer casing split or divided at its inner peripheral portion, an air tube in said casing, a leather jacket comprising inner and outer sections embedded in the outer casing, an annular protector comprising a flexible armor located between the sections of the leather jacket at its outermost portion, a pair of flexible belts connected at their outer edges with the opposite edges of the protector, stitching connecting the opposite adjacent edges of the sections of the leather jacket and also connecting these portions of the jacket with the lower or inner edges of the flexible belts, and anchor bolts connected with the flexible belts and embedded in the inner divided portions of the outer casing.

3. A tire of the class described, comprising a hollow outer casing capable of being fitted to the rim of a wheel, the said casing having its inner circumferential side split for the insertion of a pneumatic tube, and having an annular closed compartment arranged concentric to the tube, a series of overlapping arc-shaped armor shells forming an annular protector for the pneumatic tube, disposed in the closed compartment of the casing, a pair of anchor-belts disposed in the closed compartment of the casing and connected to the armor shells, adapted to hold the shells centrally with respect to the tread of the tire, and centrally to the peripheral side of the pneumatic tube, a series of anchor-chains inter-woven with said belts, the corresponding chains of each belt connecting at their upper ends to one end of each shell, their lower ends fitted with anchor-bolts embedded in the material of said casing, and a leather casing to inclose said armor shells and said anchor belts.

4. In a puncture-proof tire, the combination with a wheel rim and a pneumatic tube, of an outer casing adapted to be attached to the rim and to inclose the said tube, a puncture-proof armor comprising a series of arc-shaped shells forming an annular part, disposed in the wall of said outer casing surrounding the peripheral side of the pneumatic tube, each of said shells partially overlapping and closely contacting with the preceding shell, a pair of woven metal aprons to anchor and hold said shells centrally with respect to the tread of the tire, the upper edges of said belts being connected with the opposite edges of said shells, the lower edge of each belt provided with a plurality of equally spaced anchor-bolts corresponding to the number of said shells, the said anchor-bolts rigidly embedded in the material of said outer casing, and a leather jacket surrounding said armor and belts to protect them from contact with said outer casing.

In testimony whereof I affix my signature in presence of two witnesses.

EUGENE J. C. TIMERMAN.

Witnesses:
EDWARD F. SHEA,
HARRY DE WALLACE.